(12) United States Patent
Kollata et al.

(10) Patent No.: US 11,697,284 B2
(45) Date of Patent: *Jul. 11, 2023

(54) DROP CHARACTERISTIC MEASUREMENT

(71) Applicant: Kateeva, Inc., Newark, CA (US)

(72) Inventors: Eashwer Chandra Vidhya Sagar Kollata, Fremont, CA (US); Timothy Walter Dion, San Jose, CA (US); Tze Hwei Tseeng, Mountain View, CA (US)

(73) Assignee: Kateeva, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,657

(22) Filed: Apr. 1, 2022

(65) Prior Publication Data
US 2022/0219448 A1  Jul. 14, 2022

Related U.S. Application Data

(63) Continuation of application No. 16/719,666, filed on Dec. 18, 2019, now Pat. No. 11,318,738.
(Continued)

(51) Int. Cl.
*B41J 2/045* (2006.01)
*G02B 26/08* (2006.01)
(Continued)

(52) U.S. Cl.
CPC .......... *B41J 2/0456* (2013.01); *G01B 11/285* (2013.01); *G02B 26/0883* (2013.01); *G02B 27/30* (2013.01); *B41J 2/04581* (2013.01)

(58) Field of Classification Search
CPC ... B41J 2/0456; B41J 2/04581; G01B 11/285; G02B 26/0883; G02B 27/30
See application file for complete search history.

(56) References Cited

U.S. PATENT DOCUMENTS 7,055,925 B2  6/2006  Subirada et al.
7,823,535 B2  11/2010  Hanafusa et al.
(Continued)

FOREIGN PATENT DOCUMENTS

JP  2007117833 A  5/2007
JP    4273627 B2  6/2009
(Continued)

OTHER PUBLICATIONS

EP Supplementary Search Report dated Aug. 19, 2022 for EP Patent Application No. 19900912.7.
(Continued)

*Primary Examiner* — Thinh H Nguyen
(74) *Attorney, Agent, or Firm* — Hauptman Ham, LLP

(57) ABSTRACT

An inkjet printing system with a droplet measurement apparatus is described herein. The droplet measurement apparatus has a light source with a collimating optical system, an imaging device disposed along an optical path of the collimating optical system, and a droplet illumination zone in the optical path of the collimating optical system, the droplet illumination zone having a varying droplet illumination location, wherein the light source, the imaging device, or both are adjustable to place a focal plane of the imaging device at the droplet illumination location. The droplet measurement apparatus is structured to accommodate at least a portion of a dispenser of the printing system within the droplet illumination zone.

20 Claims, 5 Drawing Sheets

Related U.S. Application Data

(60) Provisional application No. 62/810,481, filed on Feb. 26, 2019, provisional application No. 62/783,767, filed on Dec. 21, 2018.

(51) Int. Cl.
  *G01B 11/28* (2006.01)
  *G02B 27/30* (2006.01)

(56) References Cited

U.S. PATENT DOCUMENTS

| | | |
|---|---|---|
| 9,010,899 B2 | 4/2015 | Harjee et al. |
| 9,352,561 B2 | 5/2016 | Harjee et al. |
| 9,664,627 B2 | 5/2017 | Horstmeyer |
| 10,414,181 B2 | 9/2019 | Lowrance et al. |
| 11,318,738 B2 | 5/2022 | Kollata et al. |
| 2001/0043245 A1 | 11/2001 | Endo et al. |
| 2008/0151270 A1 | 6/2008 | Albertalli et al. |
| 2012/0309252 A1 | 12/2012 | Takeuchi |
| 2017/0010456 A1 | 1/2017 | Gopinath et al. |
| 2018/0283856 A1 | 10/2018 | Suemasu et al. |
| 2019/0315122 A1* | 10/2019 | Yokoyama ........... B41J 2/14032 |
| 2021/0146682 A1 | 5/2021 | Cabani et al. |

FOREIGN PATENT DOCUMENTS

| | | |
|---|---|---|
| JP | 4645811 B2 | 3/2011 |
| TW | 202028721 A | 8/2020 |

OTHER PUBLICATIONS

Notification of Transmittal of the International Search Report and the Written Opinion of the International Searching Authority, dated Feb. 27, 2020, for International Application No. PCT/US2019/067525.

Notice of Allowance dated Jan. 20, 2022 in U.S. Appl. No. 16/719,666.

Non-Final Office Action dated Jul. 20, 2021 in U.S. Appl. No. 16/719,666.

* cited by examiner

DROP CHARACTERISTIC MEASUREMENT

CROSS-REFERENCE TO RELATED APPLICATIONS

This is a continuation application of copending U.S. patent application Ser. No. 16/719,666, filed Dec. 18, 2019, which claims benefit of U.S. Provisional Patent Application Ser. No. 62/783,767 filed Dec. 21, 2018, and U.S. Provisional Patent Application Ser. No. 62/810,481 filed Feb. 26, 2019, each of which is incorporated herein by reference.

FIELD

Embodiments of the present invention generally relate to inkjet printers. Specifically, methods and apparatus for monitoring and control of print materials during deposition processes are disclosed.

BACKGROUND

Inkjet printing is common, both in office and home printers and in industrial scale printers used for fabricating displays, printing large scale written materials, adding material to manufactured articles such as PCB's, and constructing biological articles such as tissues. Most commercial and industrial inkjet printers, and some consumer printers, use piezoelectric dispensers to apply print material to a substrate. A piezoelectric material is arranged adjacent to a print material reservoir. Applying a voltage to the piezoelectric material causes it to deform in a way that applies a compressive force to the print material reservoir, which is constructed in turn to eject print material when the compressive force is applied.

Some inkjet printing applications rely on extreme precision in positioning of print nozzles, quantity and type of print material ejected, and velocity and trajectory of droplet ejection. When nozzles fail to eject print material on demand, with the correct volume, velocity, and trajectory, printing faults result and time and money must be spent correcting the faults. Optical systems are routinely used to monitor droplet size and flight from print nozzles to substrates. Such systems typically rely on illuminating droplets of print material to determine droplet characteristics. The droplets are typically very small, for example 10-15 µm in diameter, and sharp focus of the images captured is helpful in ascertaining droplet characteristics with precision. It is most useful, in addition, to capture the images while the droplets are close to the ejection nozzle. These considerations can constrain the geometry of illumination apparatus. There is need in the art for flexible droplet illumination hardware.

SUMMARY

Embodiments described herein provide a droplet measurement apparatus, comprising a light source having a collimating optical system; an imaging device disposed along an optical path of the collimating optical system; and a droplet illumination zone in the optical path of the collimating optical system, the droplet illumination zone having a varying droplet illumination location, wherein the light source, the imaging device, or both are adjustable to place a focal plane of the imaging device at the droplet illumination location.

Other embodiments described herein provide a printing system, comprising a substrate support; and a print assembly operatively coupled to the substrate support, the print assembly comprising a print support; a dispenser assembly movably coupled to the print support; and a droplet measurement apparatus coupled to the print support, the droplet measurement apparatus comprising a housing; a light source disposed in the housing, the light source comprising a collimating optical system; a droplet illumination zone having a varying droplet illumination location; and an imaging device disposed in the housing to receive radiation from the droplet illumination zone, the light source, droplet illumination zone, and imaging device defining a focal plane that is adjustable to the droplet illumination location.

Other embodiments described herein provide a method, comprising positioning a dispenser of an inkjet printer in proximity to an illumination zone of a droplet measurement apparatus; emitting a beam of collimated light from a light source through the illumination zone; aligning a nozzle of the dispenser with an optical path of the beam of collimated light; emitting a droplet from the nozzle into the illumination zone; illuminating the droplet at an illumination location using the beam of collimated light to form a radiation signature of the droplet; receiving the radiation signature at an imaging device; and adjusting a focal plane of the imaging device to the illumination location.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

A printing system is described herein that has a droplet measurement apparatus with flexible geometry for capturing droplets at different focal planes for various print ejector designs.

Figure 1:
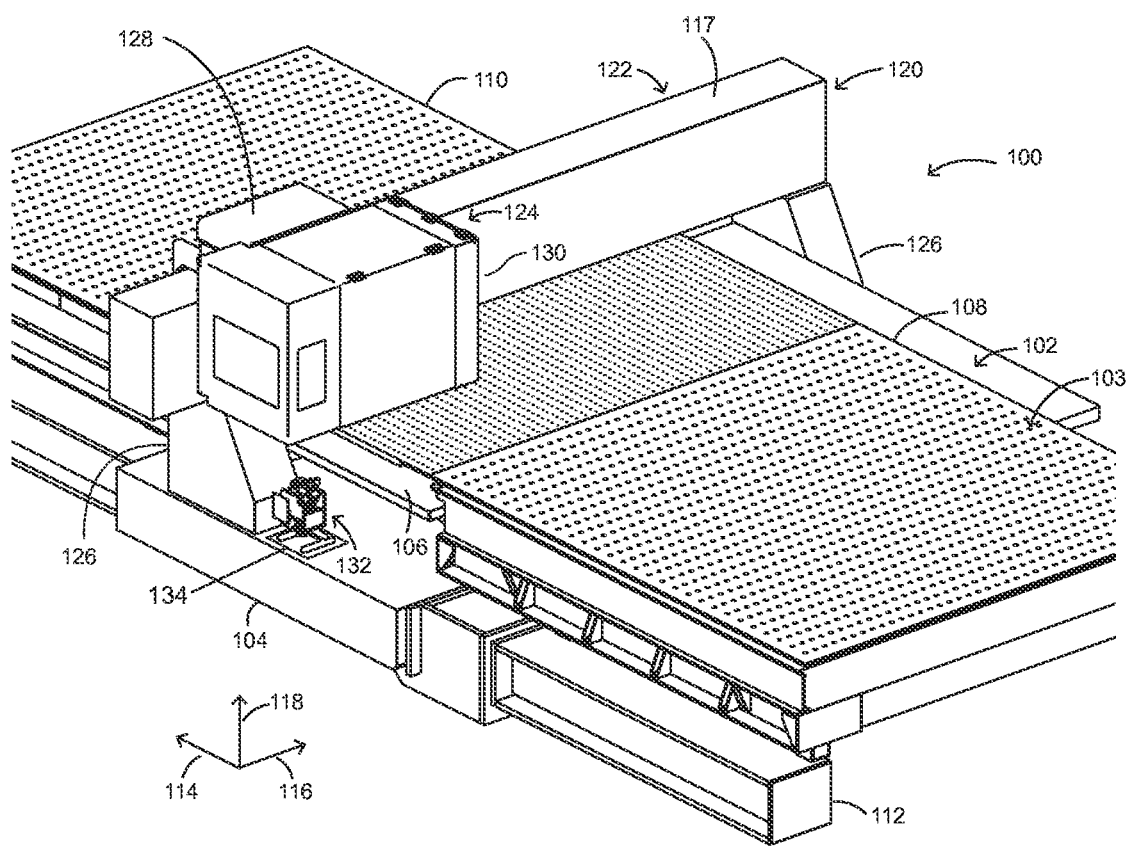
FIG. 1 is a top isometric view of a printing system according to one embodiment.

FIG. 1 is an isometric top view of a printing system 100 according to one embodiment. The printing system 100 has a substrate support 102 mounted on a base 104. The base 104 comprises one or more solid massive objects that provide a stable foundation for the printing system 100. In some cases, the base 104 is one or more granite blocks. Using a solid massive object as the base minimizes unwanted vibration or other movement of the printing system 100.

The substrate support 102 includes a working portion 106, a first staging portion 108, and a second staging portion 110. The working portion 106 is disposed between the first staging portion 108 and the second staging portion 110. The working portion 106 is supported directly on the base 104, while each of the staging portions 108 and 110 are supported by base extensions 112 attached to the base 104 and extending laterally from the base 104. The base extensions 112 may be made of any structurally strong material, such as steel. The stability of the base 104 minimizes uncontrolled motion of the substrate and/or other printer components at the location where material is dispensed onto the substrate.

The substrate support 102, in particular the working portion 106, is a table that supports a substrate in a printing position in the printing system 100. The substrate support 102 has a supporting surface 103 that provides a low-friction or frictionless support to allow precise movement and positioning of a substrate for printing. The table is rectangular, with a long dimension in a first direction 114 and a short dimension in a second direction 116 perpendicular to the first direction 114. During printing, the substrate is moved in the first direction 114. The short dimension is similar to a maximum dimension of a substrate in the second direction 116, which is a cross-scan direction. The long dimension may be up to about 10 m, while the short dimension is typically 2-3 m. A third direction 118 is perpendicular to both the first direction 114 and the second direction 116.

The printing system 100 has a print assembly 120 juxtaposed with the working portion 106. The print assembly 120 includes a dispenser support 122 and a dispenser assembly 124. The dispenser support 122 comprises two stands 126, one on either side of the working portion 106 and aligned along the cross-scan direction. The stands 126 rise from the base 104, and may be attached or integrally formed with the base 104. The stands 126 support a rail 117 that extends across the working portion 106 in the second direction 116 from one stand 126 to the other stand 126. Multiple stands may be used on each side of the working portion 106 to support the rail 117, and multiple rails 117 may be used to support devices that scan across the working portion 106, such as imaging devices and drying devices.

The dispenser assembly 124 is coupled to the rail 117 by a carriage 128, which includes an actuator that moves the carriage 128 along the rail 117 to position the dispenser assembly 124 at a desired location in the second direction 116. During a print job, the substrate moves by the dispenser assembly 124 in the first direction 114, sometimes called the scanning direction, while the dispenser assembly 124 is positioned in the second direction 116, sometimes called the cross-scan direction, by operation of the carriage 128 to deposit material in a desired location on the substrate. A dispenser housing 130 is coupled to the carriage 128. One or more dispensers (not shown) may be disposed in the dispenser housing 130 to dispense print material toward the working portion 106. The dispensers dispense print material toward the substrate as the substrate moves by the dispenser assembly 124. Each dispenser typically has a plurality of ejection nozzles (not shown) at an ejection surface of the dispenser facing the working portion 106.

A print job may include depositing droplets of print material on a substrate in an extremely precise manner. Droplets having dimension of 10-15 µm are deposited at a target location on the substrate. The target location may have dimension of 15-20 µm. The droplets are deposited by ejecting droplets having the requisite dimension from the ejection nozzles at a time, velocity, and trajectory toward a droplet deposition location, which is a predetermined location above the substrate support where the target location of the substrate will be positioned when the droplet arrives at the droplet deposition location. The size, ejection time, velocity, and trajectory of the droplets is determined to place the droplets at the droplet deposition location when the movement of the substrate brings the target location to the droplet deposition location. The extreme precision of such processing requires excellent control of droplet size, ejection time, velocity, and trajectory from the ejection nozzles.

In order to achieve such control of droplet properties, the output of the ejection nozzles is measured. The printing system 100 includes a droplet measurement apparatus 132 located near one of the stands 126. The droplet measurement apparatus 132 is an optical system that detects the interaction of specifically configured electromagnetic radiation with droplets ejected from the dispensers in the dispenser housing 130 to determine the ejection characteristics of the dispenser—droplet size, velocity, and trajectory—as a function of impulse input to the dispenser and characteristics of the print material. The droplet measurement apparatus 132 can be attached to the stand 126, or as shown here may be supported on the base 104 near the stand 126. The droplet measurement apparatus 132 is supported beside the working portion 106 of the substrate support 102 to allow the dispenser assembly 124 to access the droplet measurement apparatus 132. The dispenser assembly 124 moves along the rail 117 to the stand 126, or vicinity thereof, to engage with the droplet measurement apparatus 132. Typically, a controller controls positioning of the dispenser assembly 124 based on predetermined location data for the droplet measurement apparatus 132 stored in, or accessible to, the controller. An optional actuated platform 134 is shown here if the ability to raise and lower the droplet measurement apparatus 132 is desired. Such ability may be useful to move the droplet measurement apparatus 132 away from the dispenser housing 130, or other equipment, when not in use. The actuated platform 134 may also be useful to precisely position the droplet measurement apparatus 132 with respect to the dispenser housing 130 for best results in recording droplet characteristics.

Figure 2A:
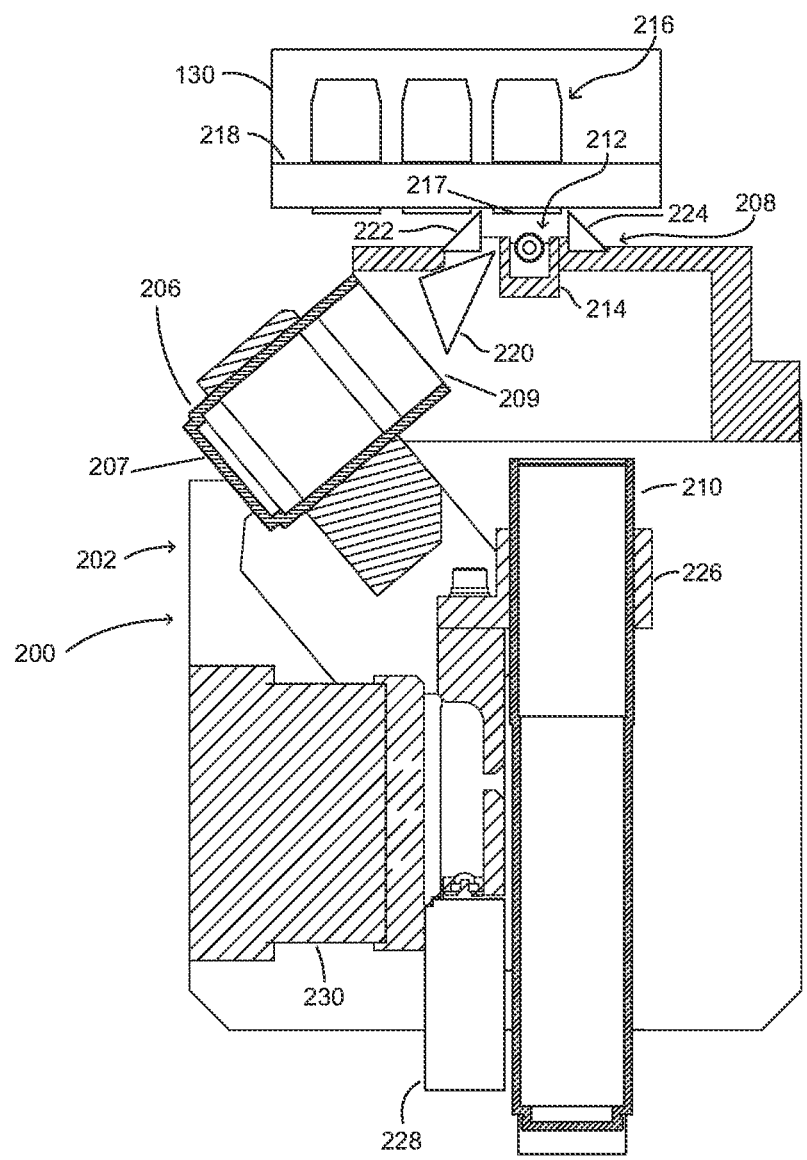
FIG. 2A is a cross-sectional view of a droplet measurement apparatus according to another embodiment.

FIG. 2A is a cross-sectional view of a droplet measurement apparatus 200 according to one embodiment. The droplet measurement apparatus 200 may be used as the droplet measurement apparatus 132 in the printing system 100. The section plane of FIG. 2A is perpendicular to the first direction 114 of FIG. 1. A frame 202 holds a light source 206, a droplet illumination zone 208, and an imaging device 210 in optical engagement. The light source 206 is a collimated light source with a light source 207 and a collimating optical system 209 optically coupled to the light emitter. The light source 206 emits collimated light toward the droplet illumination zone 208. The dispenser housing 130, with dispensers 216, are shown installed in a dispenser tray 218 in position to engage the droplet measurement apparatus 200. A droplet is ejected from an ejection nozzle (not shown) at an ejection surface 217, which may be a surface of an ejection plate, of a dispenser 216 toward the droplet illumination zone 208 and into receptacle 214.

The collimated light is steered by a first steering optic 222 and a second steering optic 224 through a droplet measurement zone 212 of the droplet illumination zone 208 to interact with the droplet passing through the droplet illumination zone 208. An optional alignment optic 220 aligns the collimated light with the first steering optic 222. Each of the first steering optic 222 and the second steering optic 224 are prisms in this case, but other optical devices, or combinations, can be used as steering optics. The alignment optic 220 is also a prism in this case. The steering optics allow the light source 207 and the imaging device 210 to have optical axes that are not parallel, reducing the footprint of the droplet measurement device 200. The steering optics optically couple the light source 207 and the imaging device 210 along an optical path that proceeds through the droplet illumination zone 208.

Following interaction with the droplet, the light is steered to the imaging device 210. The imaging device 210 captures an image of the light from the interaction with the droplet to record data about the droplet. The imaging device 210 may be a camera, CCD array, photodiode array, or other imaging apparatus. The imaging device is supported in operating position by a holder 226. The holder 226 is coupled to a linear positioner 228, which in turn is coupled to a mount 230 inside the frame 202.

Figure 2B:
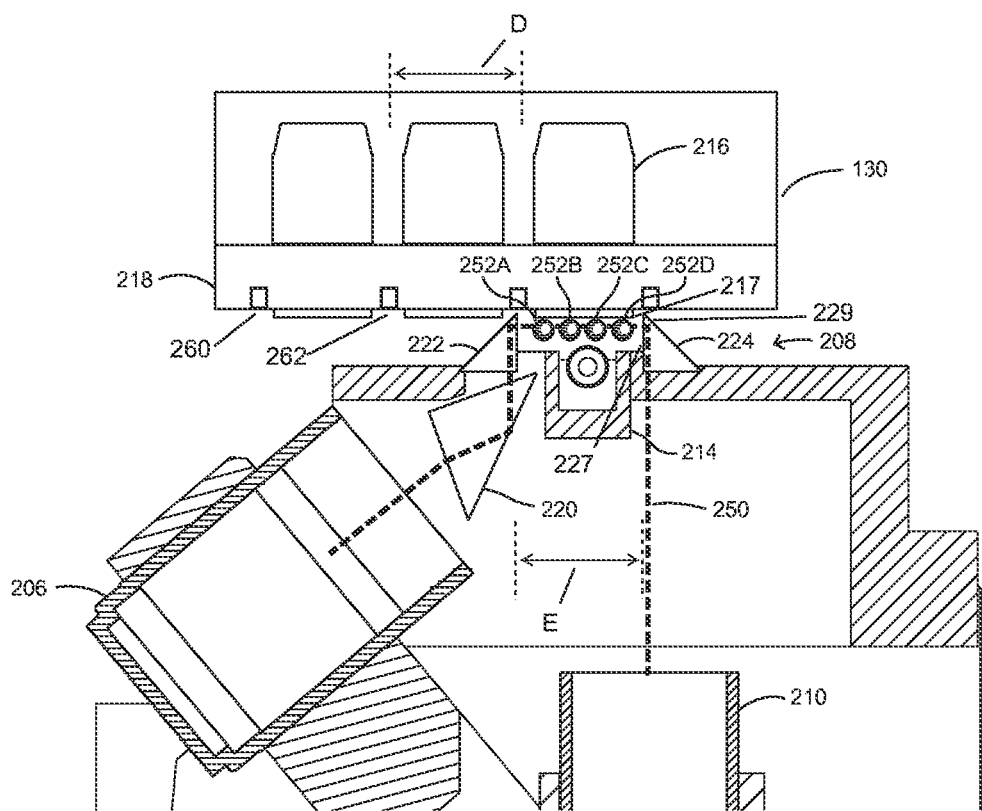
FIG. 2B is a close-up cross-sectional view of the droplet illumination zone of the droplet measurement apparatus of FIG. 2A.

FIG. 2B is a close-up view of the droplet illumination zone 208 to illustrate operation of the droplet measurement apparatus 200. The light source 206, droplet illumination zone 208, and imaging device 210 are positioned along an optical path 250 of the collimated light. The optical path 250 is not straight in this case to allow the light source 206 and imaging device 210 to be contained in a small footprint. The ejection nozzles of the dispensers 216 eject droplets along paths that intersect with the optical path 250 at droplet illumination locations. Here, four droplet illumination locations 252A, 252B, 252C, and 252D are shown corresponding to four ejection nozzles in the ejection surface 217 of the dispenser 216. The droplet illumination locations may correspond to the positions of ejection nozzles in the ejection surface 217. So, if the ejection surface 217 has five ejection nozzles arranged to eject droplets into the optical path, there will be five droplet illumination locations. Generally, the droplet illumination locations will be defined by the intersection of a flight path from each ejection nozzle with the optical path 250. At each droplet illumination location 252A-D, a droplet may be illuminated by the collimated light resulting in illumination signature propagated along the optical path 250 to the imaging device 210. The light is collimated to a change in spot size of less than about 1% per meter. Here, the optical path 250 is about 0.25 meters long.

In order to image the droplet illumination and recover usable data on droplet size, velocity, and trajectory, the imaging device 210 focuses the light received from the droplet illumination zone 208 along the optical path 250. Focusing the light locates a focal plane of the imagining device 210 at the droplet illumination location 252A, 252B, 252C, or 252D, depending on where the droplet is to be ejected. Thus, the droplet measurement device 200 has an adjustable focal plane. Because the optics of the imaging device 210 have high resolution and/or optical power, the focal depth or working range of the imaging device 210 is small. For that reason, the imaging device 210 is movable with respect to the frame 202. In alternative embodiments, adjusting the focal plane of the imaging device can include adjusting a focus component of the imaging device, such as a lens, mirror, or prism.

Referring again to FIG. 2A, the linear positioner 228 is actuated to extend or retract, moving the imaging device 210 toward or away from the illumination zone 208. Moving the imaging device 210 changes the length of the optical path 250, along with the focal limits of the imaging device 210 such that the working range of the imaging device 210 includes the droplet illumination location 252A, 252B, 252C, or 252D, of interest. Thus, if a droplet is to be ejected from a nozzle aligned with the droplet illumination zone 252A, the linear positioner 228 is actuated to position the imaging device 210 such that the working range of the imaging device includes the droplet illumination location 252A, and likewise with the locations 252B, 252C, and 252D.

The prisms 222 and 224 are positioned on either side of the droplet illumination zone 208, with the receptacle 214 between them. Thus, the prisms 222 and 224 are located either side of the receptacle 214. The prisms 222 and 224 protrude upward above the upper extent of the receptacle 214 in order to direct light from the light source 206 along the optical path 250 through the droplet illumination zone 208. Here, the prisms 222 and 224 are triangular, each having one right-angle edge, all three faces being rectangular. The prisms 222 and 224 are oriented such that a face 227 adjacent to the right angle edge faces the droplet illumination zone 208. In this orientation, an edge 229 adjacent to the face 227 extends toward the dispenser housing 130 beyond the optical path 250. The upward extension of the prisms 222 and 224 locates the optical path 250 in the illumination zone at a distance from the receptacle 214 that allows the dispenser housing 130 to be positioned with the optical path 250 near a flexure plate 260 of the dispenser housing 130 such that the droplet measurement apparatus 200 captures an image of the droplet before characteristics of the droplet change as the droplet travels through the atmosphere.

The flexure plate 260 has a plurality of channels 262. In this view, the channels 262 extend into the plane of FIGS. 2B (and 2A). The channels 262 are generally located around the dispensers 216 and spaced apart a distance D that is generally similar to a distance E between the two prisms 222 and 224. Specifically the distance E is a distance between top extremities of the prisms 222 and 224. The channels 262 allow the dispenser housing 130, properly positioned to register the prism 222 and 224 upward protrusions with the channels 262, to approach the optical path 250 more closely by providing additional space to accommodate the upward protrusions of the prisms 222 and 224. The channels 262 are generally located between the dispensers 216 such that a portion of any dispenser 216 can be positioned between the prisms 222 and 224, by positioning the upward protrusions of the prisms 222 and 224 in the channels 262 on either side of the desired dispenser 216. In this way, the flexure plate 260 can be positioned as close as possible to the optical path 250 for best imaging results.

Additionally, the optical path 250 is configured to bring the optical path as close to the dispensers 216 as possible in the droplet illumination zone 208. Thus, the optical path 250 is brought as close as possible to the face 227 that faces across the droplet illumination zone 208 so that the light path through the prisms 222 and 224 is near the top of the upward projections of the prisms. Such an arrangement provides closer engagement of the ejection surface of the dispensers 216 to the optical path 250.

Figure 3:
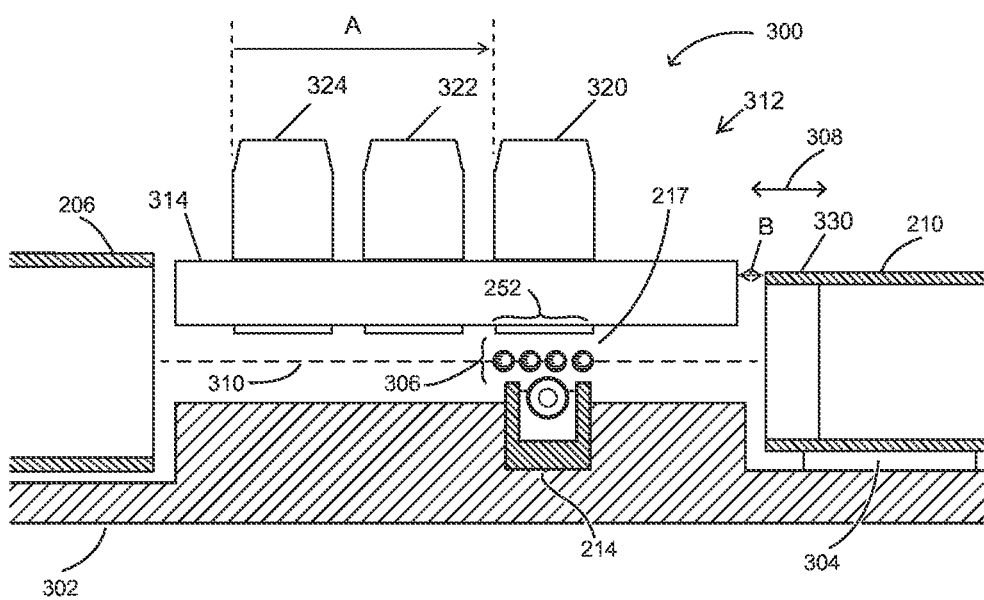
FIG. 3 is a cross-sectional view of a droplet measurement apparatus according to another embodiment.

FIG. 3 is a cross-sectional view of a droplet measurement apparatus 300 according to another embodiment. The droplet measurement apparatus 300 is similar in many respects to the droplet measurement apparatus 200 of FIGS. 2A and 2B, and the same elements are labeled with the same reference numerals. The chief difference between the droplet measurement apparatus 300 and the droplet measurement apparatus 200 is that the light source 206 and the imaging device 210 are aligned. The receptacle 214 is disposed in a support 302 that extends outward to support the light source 206 and the imaging device 210 in a transverse position relative to the droplet illumination zone 208. The light source 206 is positioned on one side of the droplet illumination zone 208, and the imaging device 210 is positioned opposite from the light source 206 with the droplet illumination zone 208 between the light source 206 and the imaging device 210. The optical axes of the light source 206 and the imaging device 210 are aligned here along an axis 310 that extends from the light source 206, through the droplet illumination zone 208, directly to the imaging device 210.

In this case, the imaging device 210 is coupled to a linear positioner 304 that is supported on the support 302. The linear positioner 304 moves the imaging device 210 closer to or further from the droplet illumination zone 208 in a transverse direction, as shown by the arrow 308, to move the focal plane of the imaging device to coincide with one of the droplet illumination locations 252 where a droplet is to be measured.

Positioning the light source 206 and the imaging device 210 in line can present challenges in getting a high resolution image of some droplet locations. In FIG. 3, a print assembly 312 has three dispensers, a first dispenser 320, a second dispenser 322, and a third dispenser 324, coupled into a frame 314, which may be part of a dispenser housing like the housing 130 of FIG. 1. The three dispensers 320, 322, and 324 are aligned along the optical axis 310 with a spacing set by operational specifications of the printing system. The dispensers are shown positioned between the light source 206 and the imaging device 210 in order to get an image of droplets 306 immediately upon exiting the dispenser before any characteristics of the droplet change appreciably. Positioning the dispenser between the light source 206 and the imaging device 210 limits how close the imaging device can be positioned to some droplet illumination locations, for example those furthest from the imaging device 210 and closest to the light source 206. In some cases, the desired image resolution and working range may be difficult to harmonize merely by moving the imaging device 210.

To augment the working range of the imaging device 210, a tunable lens 330 may be coupled to the imaging device 210. A tunable lens can extend the working range over which the imaging device 210 can deliver high resolution images, so the imaging device 210 can capture high resolution images of the closest droplet illumination location of the first dispenser 320 and the furthest droplet illumination location of the third dispenser 324.

As shown in FIG. 3, in order to position the third dispenser 324 over the receptacle 214 to deliver a droplet, the dispenser assembly must be moved to the right by a distance A which is larger than a clearance B between the dispenser assembly 312 and the imaging device 210. The imaging device 210 must therefore be moved to the right by actuating the linear positioner 304, increasing the distance between the imaging device 210 and the droplet illumination zone 208. If the imaging device 210, without augmentation by a tunable lens, does not have sufficient working range to deliver high resolution images at the increased distance, the tunable lens 330 can be used to increase the working range of the imaging device 210. In this way, suitable images can be captured of droplets ejected from all three of the dispensers 320, 322, and 324. It should be noted that in any of the embodiments described herein, a tunable lens such as the tunable lens 330 may be used along with, or instead of, the linear positioner 304 or 228.

The droplet measurement apparatus 300 of FIG. 3 has, in some respects, a simpler configuration than the droplet measurement apparatus 200 of FIGS. 2A and 2B. The droplet measurement apparatus 200, however, engages the dispensers 216 with the optical path 250 with minimal insertion of the dispensers 216 into the imaging apparatus. In the apparatus 300, the entire dispenser housing 130 is inserted between the light source 206 and the imaging device 210, while with the droplet measurement apparatus 200, only the end of one dispenser 216 is inserted between the upper tips of the prisms 222 and 224, with less vertical movement needed. The most useful design can be tailored to the individual application.

Figure 4:
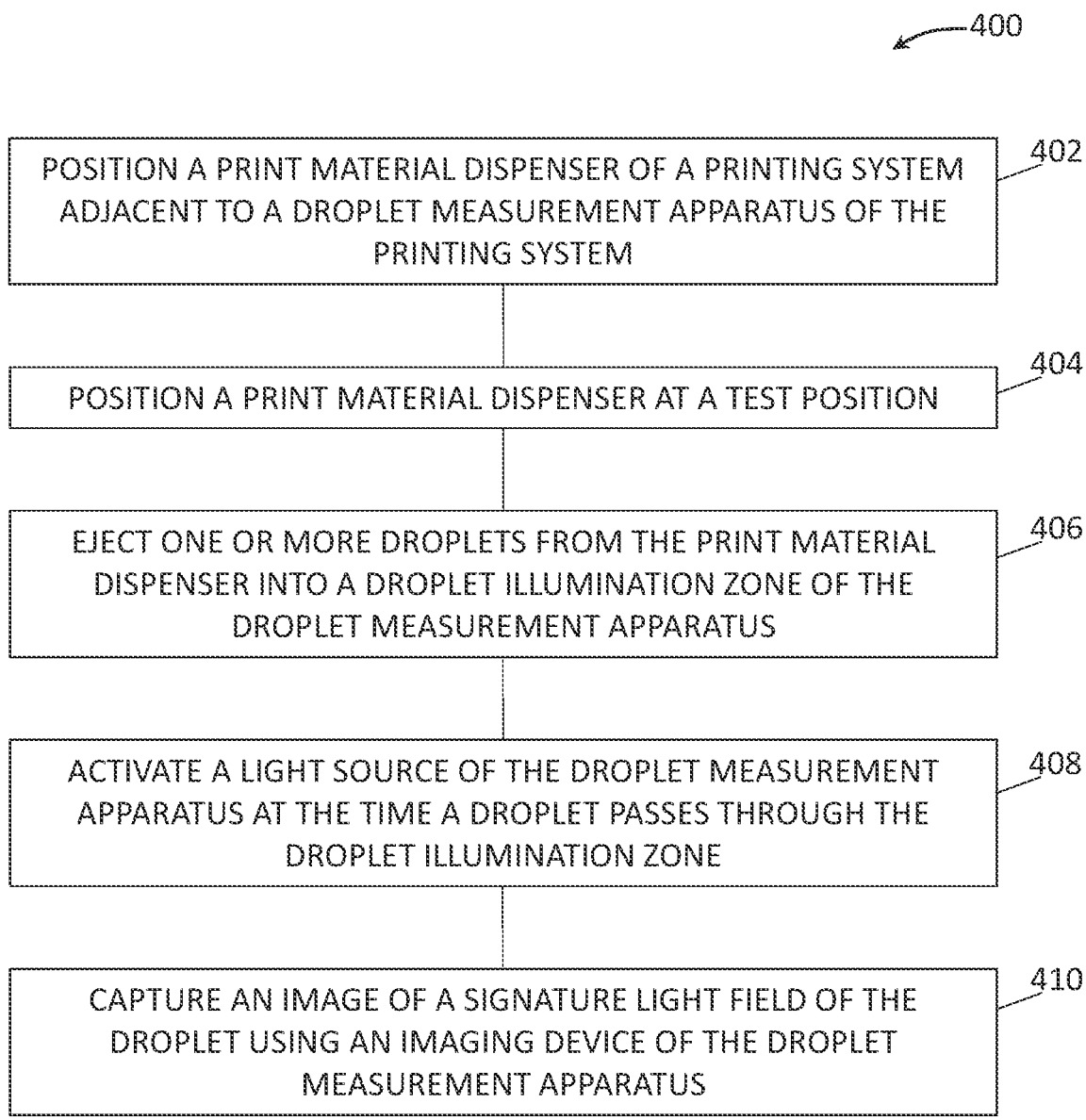
FIG. 4 is a flow diagram summarizing a method according to another embodiment.

FIG. 4 is a flow diagram summarizing a method 400 according to another embodiment. The method 400 is a method of obtaining a measurement of a characteristic of a droplet ejected from a print material dispenser of a printing system such as an inkjet printer. The method 400 can be practiced using the apparatus described herein. At 402, the print material dispenser is positioned adjacent to a droplet measurement apparatus of the printing system. If more than one dispenser is used, the dispensers may be housed in a dispenser assembly. The droplet measurement apparatus is typically located outside of a substrate processing area of the printing system such that the operation of performing droplet measurement can be done without impacting the substrate processing area or any substrate that might be positioned thereon.

The droplet measurement apparatus generally has a light source for illuminating a droplet in a droplet illumination zone and an imaging device for receiving light from the droplet illumination zone after the light interacts with a droplet. The light source includes collimating optics, and the droplet measurement apparatus includes optical components to direct the light from the light source on an optical path through the droplet illumination zone to the imaging device.

The imaging device has a variable focal plane. In one instance, the imaging device is disposed on a linear positioner that can move the imaging device to position the focal plane of the imaging device at a droplet illumination location in the droplet illumination zone such that an image of the droplet is sharply focused. The focal plane of the imaging device is variable because droplets may be dispensed from nozzles at various locations in an ejection face of the dispenser, and in the case where multiple dispensers are used, the dispenser assembly may need to move to bring a target dispenser within the working range of the imaging device. In another instance, the imaging device may have a tunable lens with dynamically adjustable focal length to position the focal plane of the imaging device at different droplet illumination locations within the droplet illumination zone. The linear positioner may also be combined with the tunable lens to further extend the working range of the imaging device if desired.

The droplet illumination zone is defined by the ejection face of the dispenser, and a droplet receptacle positioned in the droplet measurement apparatus. The ejection face of the dispenser may have a plurality of ejection nozzles distributed across the ejection face. The receptacle is typically sized to accommodate the areal coverage of all ejection nozzles of a dispenser so that all ejection nozzles of a dispenser can be fired to measure droplet characteristics without having to move the dispenser. In the event multiple dispensers are used in a dispenser assembly, the dispenser assembly may be moved to position each dispenser at the droplet illumination zone in turn.

At 404, the print material dispenser is positioned at a test position. The test position is typically a position wherein the ejection face of the dispenser is located at a minimum distance from the optical path of the light used to illuminate droplets. In some cases the minimum distance is less than 2 mm, for example less than 1 mm. If optical components are used to bring the light into the droplet illumination zone, the ejection face of the dispenser, or the frame or ejection face of the dispenser assembly, may be shaped to accommodate positioning the dispenser or dispenser assembly at the test position. For example, if prisms are used to steer the light through the droplet illumination zone, in order to position a dispenser at the test position, the dispenser may be positioned partly between the prisms. In such cases, if a portion of the prisms extends above a boundary of the optical path, that is to say beyond a spatial extent of the light field used to illuminate the droplets, the ejection surface of the dispenser or the dispenser assembly may be provided with structures to accommodate the prisms so that the ejection surface can be positioned at the test position. In one instance, a dispenser assembly has a flat nozzle plate where the ejection surface of a plurality of dispensers is disposed, and the nozzle plate has notches to position the top points of two prisms used to steer light through the droplet illumination zone. To position the dispenser at the test position, the top points of the prisms are inserted into the notches such that the ejection surface of one dispenser is positioned a minimum distance from the optical path.

At 406, one or more droplets is ejected from the dispenser into the droplet illumination zone. The droplet passes through the droplet illumination zone into the receptacle. A droplet may be ejected from each nozzle of the dispenser into the receptacle without moving the dispenser, if the receptacle is sized to accommodate the entire areal coverage of ejection nozzles in the ejection surface of the dispenser. In such cases, the droplets may arrive in the droplet illumination zone at different droplet illumination locations arising from the areal distribution of ejection nozzles across the ejection surface of the dispenser. In such cases, the positions of the nozzles may be provided to a controller that is coupled to the dispenser assembly and to the imaging device to position the focal plane of the imaging device at the droplet illumination location to be used for imaging a droplet. As the droplet illumination location changes due to ejecting droplets from different nozzles, the focal plane of the imaging device is moved to image each droplet.

At 408, the light source is activated to provide illumination in the droplet illumination zone at the time a droplet passes through the droplet illumination zone. The light interacts with the droplet to produce a signature light field, which propagates to the imaging device.

At 410, the imaging device captures an image of the signature light field, which can then be analyzed to determine droplet characteristics such as volume. In some cases, the light source is pulsed to produce a plurality of images of the droplet as the droplet passes through the droplet illumination zone. The plurality of images can be analyzed to determine speed and trajectory of the droplet. Volume, ejection speed, and trajectory can be used to judge the performance of the individual nozzles of the dispenser. Because the focal plane of the imaging device can be changed to accommodate all the nozzles of a dispenser, the entire dispenser can be tested without repositioning the dispenser.

While the foregoing is directed to embodiments of the present invention, other and further embodiments of the present disclosure may be devised without departing from the basic scope thereof, and the scope thereof is determined by the claims that follow.

What is claimed is:

1. A droplet measurement apparatus, comprising:
   a light source having a collimating optical system;
   an imaging device disposed to receive light from the collimating optical system;
   a droplet illumination zone;
   a steering optic that defines an optical path of light emitted by the light source and received by the imaging device; and
   a droplet receptacle, wherein a portion of the optical path is directed through the droplet illumination zone across the droplet receptacle and the imaging device has an adjustable working range to vary a focal plane along the portion of the optical path.

2. The droplet measurement apparatus of claim 1, further comprising a linear positioner coupled to the imaging device.

3. The droplet measurement apparatus of claim 1, further comprising a lens with adjustable focal length optically coupled to the imaging device.

4. The droplet measurement apparatus of claim 3, further comprising a linear positioner coupled to the imaging device.

5. The droplet measurement apparatus of claim 1, wherein the optical path comprises a first portion between the collimating optical system and the droplet illumination zone and a second portion between the droplet illumination zone and the imaging device, and the first portion is not parallel to the second portion.

6. The droplet measurement apparatus of claim 1, wherein the steering optic comprises at least two refractive or reflective members.

7. The droplet measurement apparatus of claim 1, wherein the droplet receptacle is located below the portion of the optical path.

8. The droplet measurement apparatus of claim 1, further comprising an alignment optic to align light from the light source with the steering optic.

9. A printing system, comprising:
   a base;
   a substrate support supported on the base; and
   a print assembly supported on the base, the print assembly comprising:
      a dispenser support extending across the substrate support; and
      a dispenser assembly movably coupled to the dispenser support; and
   a droplet measurement apparatus supported on the base, the droplet measurement apparatus comprising:
      a housing;
      a light source disposed in the housing, the light source comprising a collimating optical system;
      an imaging device disposed to receive light from the collimating optical system;
      a droplet illumination zone;
      a steering optic that defines an optical path of light emitted by the light source and received by the imaging device; and
      a droplet receptacle, wherein a portion of the optical path is directed through the droplet illumination zone across the droplet receptacle and the imaging device has an adjustable working range to vary a focal plane along the portion of the optical path.

10. The printing system of claim 9, further comprising a linear positioner disposed in the housing and coupled to the imaging device.

11. The printing system of claim 9, further comprising a lens with adjustable focal length disposed in the optical path between the droplet illumination zone and the imaging device.

12. The printing system of claim 11, wherein the steering optic comprises at least two refractive or reflective members.

13. The printing system of claim 11, further comprising a linear positioner disposed in the housing and coupled to the imaging device.

14. The printing system of claim 11, wherein the imaging device is movable with respect to the housing.

15. The printing system of claim 11, wherein the steering optic comprises two prisms, the dispenser assembly comprises one or more dispensers, and a distance between the prisms is greater than a dimension of a dispenser of the one or more dispensers.

16. The printing system of claim 15, wherein the dispenser assembly further comprises a nozzle plate, and the nozzle plate has notches with spacing that matches the spacing of the prisms.

17. The printing system of claim 9, wherein the dispenser assembly is movable to position the dispenser within the illumination zone.

18. A printing system, comprising:
   a base;
   a substrate support supported on the base; and
   a print assembly supported on the base, the print assembly comprising:
      a dispenser support extending across the substrate support; and
      a dispenser assembly movably coupled to the dispenser support; and
   a droplet measurement apparatus supported on the base, the droplet measurement apparatus comprising:
      a housing;
      a light source disposed in the housing, the light source comprising a collimating optical system;
      an imaging device disposed to receive light from the collimating optical system;
      a droplet illumination zone;
      a steering optic that defines an optical path of light emitted by the light source and received by the imaging device; and
      a droplet receptacle, wherein a portion of the optical path is directed through the droplet illumination zone across the droplet receptacle and the imaging device has a lens with adjustable focal length, a linear positioner, or both to vary a focal plane along the portion of the optical path.

19. The printing system of claim 18, wherein the steering optic comprises two prisms, the dispenser assembly comprises one or more dispensers, and a distance between the prisms is greater than a dimension of a dispenser of the one or more dispensers.

20. The printing system of claim 19, wherein the droplet measurement apparatus further comprises an alignment optic to align light from the light source with the steering optic.

* * * * *